RECORDER-CONNECTOR FOR USE IN TELEPHONE CONVERSATION RECORDING

Filed Sept. 9, 1949 2 Sheets-Sheet 1

JOHN P. SMITH JR.
*INVENTOR.*

BY Robert [signature]
Attorney

JOHN P. SMITH JR.
*INVENTOR.*
*BY* [signature]
Attorney

Patented Nov. 14, 1950 2,529,636

UNITED STATES PATENT OFFICE 2,529,636

RECORDER-CONNECTOR FOR USE IN TELEPHONE CONVERSATION RECORDING

John P. Smith, Jr., Verona, N. J., assignor to The Daven Company, Newark, N. J., a corporation of New Jersey Application September 9, 1949, Serial No. 114,801

22 Claims. (Cl. 179—6)

This invention relates to a recorder-connector for insertion in a telephone line when connecting a recording instrument in the line for recording the conversation of persons talking over the line.

Order, Docket No. 6787 of the Federal Communications Commission requires that in the use of recording devices in connection with interstate and foreign message toll telephone service certain conditions must be met among which conditions are: that such use be accompanied by adequate notice to all parties to the telephone conversation that the conversation is being recorded; that such notice will be given by use of an automatic tone warning device, which will automatically produce a distinct signal that is repeated at regular intervals during the course of the telephone conversation when the recording device is in use; and such signal to have certain specified characteristics.

The primary object of the present invention is to provide a connector by means of which a recording instrument may be tapped or connected in a telephone line to permit recording of telephone conversations, which recorder is constructed and arranged so that the telephone conversation cannot be recorded without fulfilling the requirements of the order of the Federal Communications Commission and which will specificially:

Place a 1400 cycle signal tone, on the telephone line, of a duration of 0.2 second at fifteen second intervals to provide a warning to all parties to the telephone conversation that the conversation is being recorded.

The 1400 cycle signal tone may of course be altered if other frequencies are required or desired as can also the duration and sounding interval timing of the signal.

Not interrupt the normal telephone service functions in any way.

Will not transmit conversation to a recorder unless the tone warning signal is in operation.

Will send the 1400 cycle tone back along the line toward the distant telephone instrument at a level of —4 Vu (or 0.49 volt across 600 ohms) and toward the near or local telephone instrument (i. e., the instrument nearest the recorder) at a level of —14 Vu (or 0.154 volt across 600 ohms), this can be readily decreased or increased from the above values of —4 and —14 required or desired.

Will send the tone into the recorder at a level of approximately —40 Vu (.0078 volt across 600 ohms) which value can be changed as required or desired.

Thus it will be seen that when using the recorder-connector of the present invention it will be impossible to record a telephone conversation without giving all parties to the conversation warning that recording is taking place and that the warning tone will be automatically transmitted with sufficient power to be audible yet without sufficient strength or duration to interfere with the conversation or the normal services or functions of the telephone line.

Another object of the present invention is to provide a recorder-connector as specified which is comparatively simple in construction employing a minimum number of parts which are subject to wear, thus providing for long life, simplicity of construction and consequent relatively low cost of manufacture.

A further object of the present invention is the provision of a recorder-connector as specified wherein a single phase synchronous self-starting hysteresis motor, without salient poles and without direct current excitation which operates normally at synchronous speed, such as those employed in electric clocks, is used to control the sounding of the tone warning both as to the intervals of sounding the tone warning and the duration of the sounding.

Another object of the present invention is the provision, in a recorder-connector as specified of a novel form of line connector circuit comprising a special transformer, resistor, capacitor circuit which provide a number of functions such as:

Provides voice circuit between local and distant telephone;

Provides D. C. path for dial pulses;

Provides an open circuit to direct current across the telephone line so as not to short out dial pulses;

Provides voice circuit between telephone line and recorder amplifier; and

Provides tone circuit to distant telephone station at level of —4 Vu and to local telephone station at a level of —14 Vu or at lower or greater levels if required or desired.

Another object of the present invention is to provide a recorder-connector which will send out the tone warning signal at a constant level and will not shut off or interfere with the voice being recorded during the interval of the sending of the tone warning, and one which is free from key clicks or other extraneous sounds.

With these and other objects in view, as may appear from the accompanying specification, the invention consists of various features of construction and combination of parts, which will be first described in connection with the accompanying drawings, showing a recorder-connector for use in telephone conversation recording of a preferred form embodying the invention, and the features forming the invention will be specifically pointed out in the claims.

In the drawings—

Figure 2:
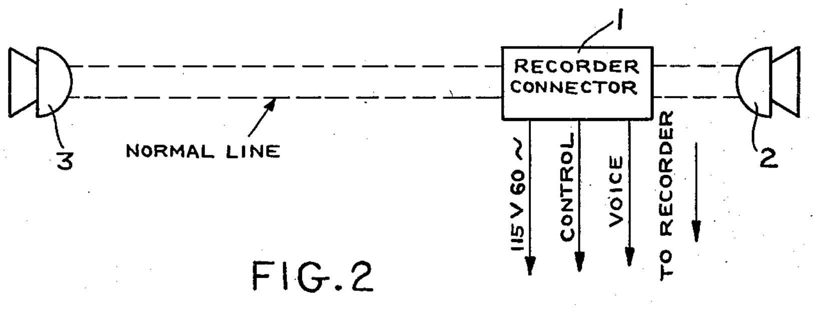
Figure 2 is a simple diagram showing the manner of connecting the recorder-connector in a telephone line.

Referring particularly to the drawings, the recorder-connector generically indicated by the numeral 1 is connected in the normal telephone line as shown generally in Figure 2 of the drawings, being placed in any convenient location near the local telephone 2, so that when a distant telephone 3 is connected in circuit with the local telephone 2, all current flowing through the line must pass through the connector 1. The connector 1 is connected to a voice recorder (not shown) of any approved type which, when connected in circuit with the recorder-connector 1 will record all conversation passing between the two telephone stations 2 and 3.

Figure 1:
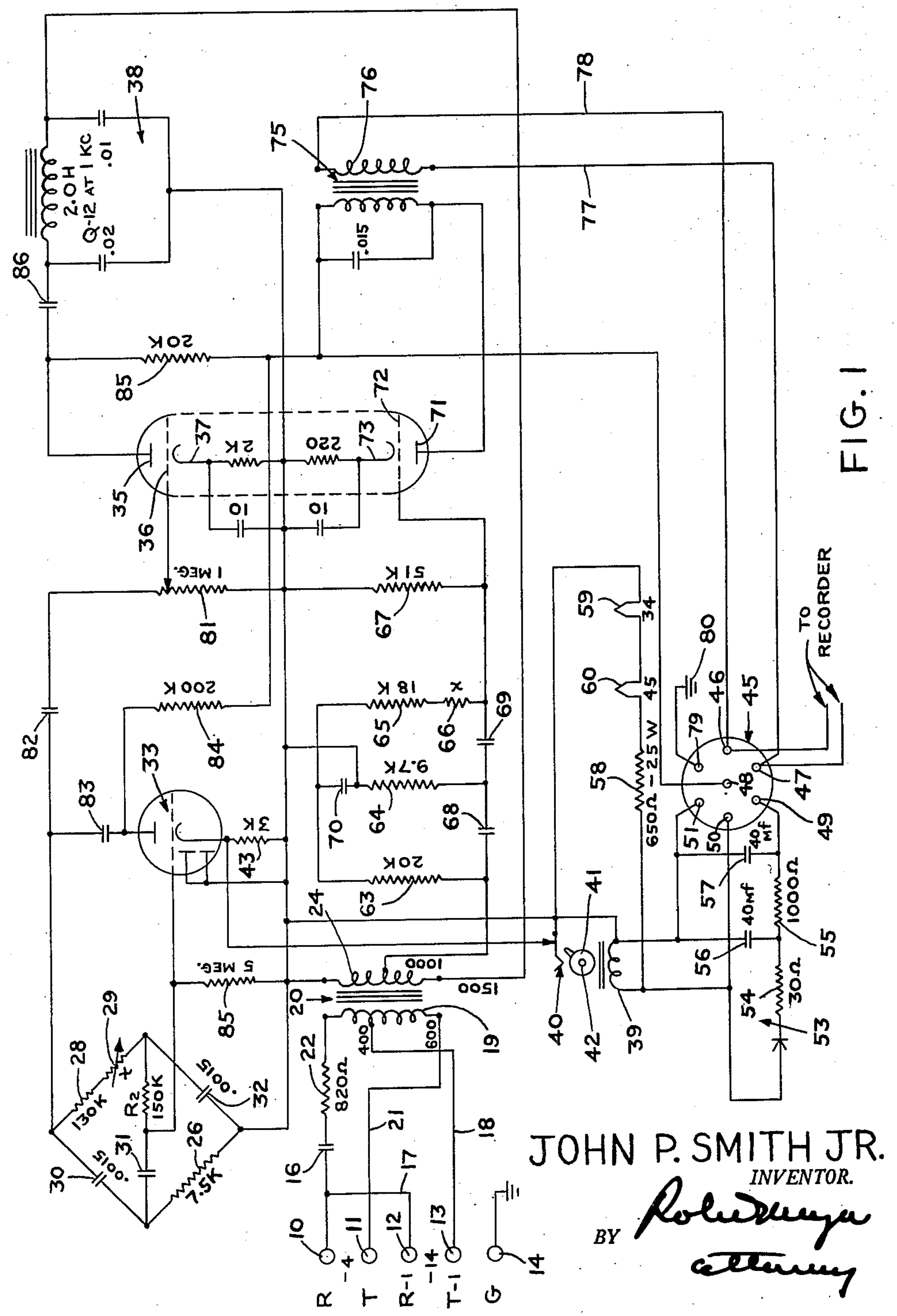
Figure 1 is a schematic diagram of the recorder-connector.
Figure 3:
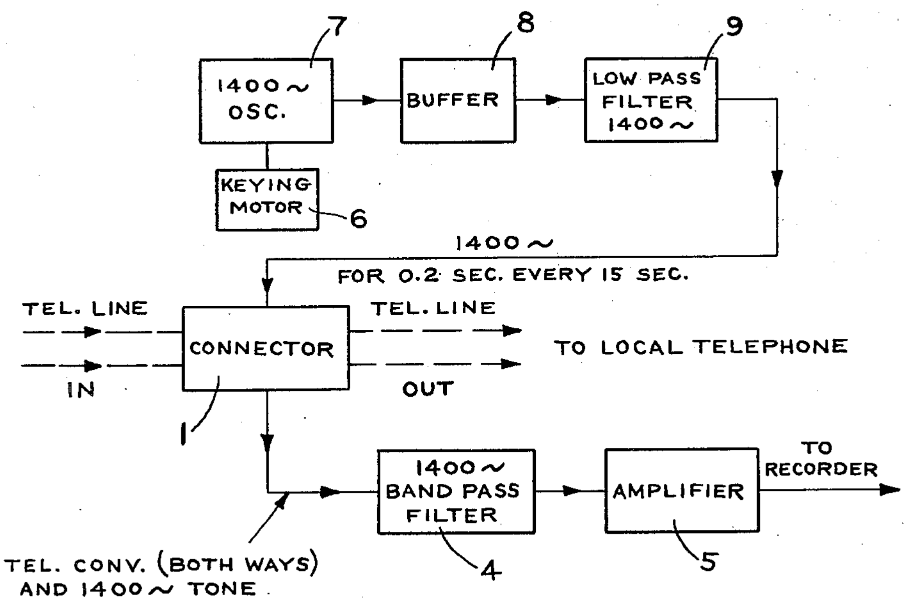
Figure 3 is a simplified block diagram of the recorder-connector.

The block diagram shown in Figure 3 of the drawings shows a general diagram of the systems of the recorder-connector, which are shown in detail in Figure 1 of the drawings.

Generically the recorder-connector embodies two distinct systems, namely, the recording system shown generically in Figure 3 as including the band elimination filter 4 and amplifier 5, which system delivers the voice currents and the tone warning signal to a recorder (not shown) and the tone warning sounding system which sounds a tone warning of 0.2 second duration every fifteen seconds. The tone warning sounding circuit or system is under control of the keying motor 6 and includes an oscillator 7, buffer 8 and low pass filter 9, for producing and filtering the harmonics out of the tone warning signal and consequently producing and sending out a tone warning free from extraneous sounds and at a constant level during the two-tenths of a second of its duration in contra-distinction to sending out the tone warning at a variable level as is done with one other recorder-connector now on the market. Also the system of present invention sends out the tone warning without interference with the voice transmission of the telephone system in contra-distinction to the shutting off of the voice during the sounding of the tone warning as is done by another recorder-connector now on the market.

The tone warning produced in the system or circuit including the oscillator 7, buffer 8 and low pass filter 9 passes to both telephone stations 2 and 3 and to the recorder (not shown) so that all parties to the telephone conversation being recorded will be advised by the tone warning that the conversation is being recorded, and the tone warning will be recorded along with the recording of the voices.

Referring specifically to Figure 1 of the drawings, which shows a schematic diagram of all of the systems or circuits of the recorder-connector and the various elements or apparatus making up such systems, the wires of the telephone line for the distant station are connected to the recorder-connector by ordinary connecting posts 10 and 11 while the wires of the local telephone station are connected to posts 12 and 13. The chassis of the recorder-connector 1 is connected through the post 14 to ground.

The D. C. current for dialing and for the local station microphone of the telephone system flows in from post 10 through wire 15, is blocked off by the condenser 16 and turns and flows through wire 17 to the post or terminal 12 of the local telephone station, while the D. C. current entering through the post 13 flows through the wire 18 into the primary coil 19 of the audio transformer 20, at a point intermediate its ends, and flows through the coil 19 and out through the wire 21 to the post 11 thus free unimpeded flow of the D. C. current for dialing and for the microphone of the local telephone station is permitted.

The A. C. or voice carrying current flows into the recorder-connector 1 through the post 10 and part of this current carrying the voice passes through the wire 17 to and out through the post 12, while the A. C. voice carrying current from the local telephone station flows in through the post 13 through the wire 18 into the primary coil 19 of the transformer 20 through the coil and out through the wire 21 to the post 11 and thence to the distant telephone station. Thus the voice carrying connection is established between the telephone station 2 and 3.

The ratio of the condenser 16, resistance 22 and transformer 20 is selected so that the tone warning signal difference across the circuit of posts or terminals 10 and 11 and across the circuit of posts or terminals 12 and 13 is a voltage ratio of 3.16 to one, for the purpose of reducing the warning tone to the local phone. That is to send the 1400 cycle warning or signal tone back along the telephone line to the distant station at a level of —4 Vu (or 0.49 volt across 600 ohms) and toward the local telephone at a level of —14 Vu (or 0.154 volt across 600 ohms).

Part of the voice carrying A. C. current flowing from both telephone stations 2 and 3 divides out and flows through the transformer 20 into the recording system or circuit and into the tone warning signal sounding system or circuit.

The 1400 cycle tone warning oscillator signal circuit comprises the bridge circuit 25 and vacuum tube 33 which produces the 1400 cycles current. This bridge circuit 25 includes resistors 26, 27, 28 and the adjustable resistance 29, condensers 30, 31 and 32. The adjustable resistor or resistance 29 is provided in the bridge circuit to permit adjustment in manufacture to compensate for inaccuracies in the resistors 26, 27 and 28, and condensers 30, 31 and 32.

The tone warning signal circuit includes the audio oscillator tube 33; the double triode tube 34, the elements 35, 36, and 37 of which, act as a buffer amplifier for the oscillator tube 33 and the low pass pi-type filter 38 which reduces the harmonic content of the 1400 cycle current. While a particular type of low pass filter is shown in the drawings it is to be understood that any type of low pass or band pass filter may be employed than that specifically shown in the drawings.

The oscillation of the oscillator tube 33 is under control of a motor 39, through a switch or key 40 to provide a tone warning signal of two-tenths ($\frac{2}{10}$) of a second duration every fifteen seconds whenever the recorder (not shown) is cut into the circuit through its control switch (not shown).

The motor 39 is a single phase synchronous self-starting hysteresis motor without salient poles and without direct current excitation which operates normally at synchronous speed or more preferably this type of motor known in the trade as a Telechron motor wherein a two-pole rotating field is produced in a cylindrical space, and into this space is introduced a sealed thin metal cylinder containing a shaft carrying one or more hardened magnet steel discs, driving a gear train. These types of motor are those used in electric clocks and hereafter in the specification and claims the motor 39 will be simply referred to as an electric clock type motor.

The motor 39 has an actuator 41, which may be in the form of a cam, an arm or other suitable structure, mounted upon its rotating shaft 42 which at specified and predetermined intervals, as above stated, actuates the switch 40 to short out of the circuit the resistance 43 and allow the oscillator tube 33 to oscillate and sound the tone warning, which after passing through the buffer in the form of the elements 35, 36 and 37 of the double triode tube 34 and the pi-type low pass filter 38 passes back through wire 44 to and through the transformer 20 to both the local and distant telephone stations of the line in which the recorder-connector is connected. The tone warning also passes to the recorder (not shown) through the plug and socket element 45 by means of which the recorder (not shown) is connected to the recorder-connector. The recorder (not shown) is connected to the recorder-connector through the terminal 46 and 47 of the plug and socket elements 45.

The control switch (not shown) of the recorder is connected in the circuit through the terminals 48 and 49 of the plug and socket element 45 and electrical power from the recorder (not shown) which is A. C. 115 volt current comes in through terminals 50 and 51 of the plug and socket, or terminal element 45 so that the electric clock type motor runs all the time, but the plates of the oscillator tube 33 and the triode 34 are not energized until the control switch (not shown) of the recorder is closed which closes the circuit through the terminals 48 and 49.

The rectifier 53 provides approximately 130 volts of the direct current pulsating for the plates of the oscillator and triode tubes 33 and 34 which is filtered by the resistors 54 and 55 and the condensers 56 and 57.

The resistor 59 drops the voltage of the incoming current from 115 volts to the filament voltages of the tubes 33 and 34 and the tube heaters indicated at 59 and 60 respectively are on at all times. The tube filaments 59 and 60 are connected in series so that if one burns out the circuit is opened up and all operations cease relative to the recording of the telephone conversation and the sounding of the tone warning.

The voices or voice carrying current passes from the secondary coil 24 of the transformer 20, along wire 62 through the band elimination filter 4 (Figure 2) which includes the resistances 63, 64, 65, 66 and 67 and condensers 68, 69 and 70 connected to form a sharply tuned three terminal bridge, tuned to 1400 cycles so that it will drop the voltage to zero at 1400 cycles. While a particular type of band elimination filter is shown in the drawings it is to be understood that other means such as the use of inductances and capacitors may be used in lieu thereof to reduce the voltage through the system at this point to zero at 1400 cycles.

From the band elimination filter 4 the voice current passes through the amplifier 5 (Figure 2) which as shown in Figure 1 of the drawings is the second half of the triode 34 comprising the elements 71, 72, and 73. The purpose of the elements 71, 72 and 73 is to amplify the voice, and to provide a shut-off for the voice to the recorder (not shown) in the event the 1400 cycle tone is shut off for any reason, such as the burning out of the oscillator tube 33, opening of the control switch (not shown) of the recorder (not shown) power failure etc. Any sound current traveling at 1400 cycles will be filtered or reduced by the band elimination filter 4.

From the triode 34 the amplified voice current flows to and through the impedance matching transformer 75 which reduces its impedance to that of the recorder (not shown).

From the secondary coil 76 of the impedance matching transformer 75 the voice current passes through the wires 77 and 78 to the terminals 46 and 47 of the terminal element 45 and thence to the recorder (not shown).

The terminals 51 and 79 of the terminal element 45 are connected during operation, and from terminal 79 to the ground as indicated at 80.

The voice current also travels along wire 44 to the triode tube 34, but entering the tube backwards to the plate of the tube modulates the tube a small non-effective amount.

An adjustable volume control 81 is placed in the circuit between the oscillator and triode tubes 33 and 34 and condensers 82 and 83 are placed between the adjustable volume control 81 and the plate of the oscillator tube 33.

Resistors 84 and 85 and a condenser 86 are interposed in the circuit between the oscillator 34 and the low pass or pi-type filter 38.

A grid resistor 85 is connected across the lines between the bridge 25 and the oscillator 33 to provide a direct current grid return path.

From the foregoing description it will be apparent that a recorder-connector for use in connecting a recorder in a telephone line to record two-way telephone conversation has been provided which will provide all of the requirements of the Order Docket No. 6787 of the Federal Communications Commission as pointed out in the preamble hereto, and which is comparatively simple in construction, employing a minimum number of parts subject to wear, and one which can be easily and readily connected in a telephone line for connecting a recorder therein.

While one form of the invention has been illustrated and described, it is obvious that those skilled in the art may vary the details of construction as well as the precise arrangement of parts without departing from the spirit of the invention and therefore it will be understood that the invention is not to be limited to the specific construction or arrangement of parts shown, but that they may be widely modified within the invention defined by the claims.

What is claimed is:

1. In a recorder-connector for connecting a conversation recorder in a telephone line, line connecting means for connecting the recorder-connector in a telephone line including an audio transformer, terminals to provide connection between the transformer and the wires of a telephone line, means connected in circuit with said transformer to sound a tone warning at predetermined time intervals for a predetermined time duration, means connected in circuit with said transformer for amplifying the voice current flowing through the transformer, a terminal element, means connecting said terminal element in circuit with both said tone warning sounding circuit means and said voice amplifying means, each terminal means including means for connection with a conversation recorder to transmit both the tone warning and amplified voice to the recorder.

2. In a recorder-connector for connecting a conversation recorder in a telephone line, line connecting means for connecting the recorder-connector in a telephone line including an audio transformer, terminals to provide connection between the transformer and the wires of a telephone line, means connected in circuit with said transformer to sound a tone warning at predetermined time intervals for a predetermined time duration, means connected in circuit with said transformer for amplifying the voice current flowing through the transformer, a terminal element, means connecting said terminal element in circuit with both said tone warning sounding circuit means and said voice amplifying means, said terminal means including means for connection with a conversation recorder to transmit both the tone warning and amplified voice to the recorder, said tone warning and voice amplifying circuits and said terminal element being connected in electrical communication so that when one of the circuits is closed all must be closed and when one circuit is open the others are automatically opened whereby it will be impossible to transmit the voices to the recorder without transmitting the tone warning therewith.

3. A recorder-connector as claimed in claim 1, including a D. C. blocking condenser in one telephone line connection to the transformer.

4. A recorder-connector as claimed in claim 1, including a D. C. current blocking condenser in one telephone line connection to the transformer and a resistor connected in the telephone line connection containing the condenser, the ratio of said condenser, resistor and transformer being selected to provide a tone signal difference of a voltage ratio of approximately three and sixteen one-hundredths to one between the local telephone station and the distant telephone station.

5. In a recorder-connector for connecting a conversation recorder in a telephone line, line connecting means for connecting the recorder-connector in a telephone line including an audio transformer, terminals to provide connection between the transformer and the wires of a telephone line, means connected in circuit with said transformer to sound a tone warning at predetermined time intervals for a predetermined time duration, means connected in circuit with said transformer for amplifying the voice current flowing through the transformer, a terminal element, means connecting said terminal element in circuit with both said tone warning sounding circuit means and said voice amplifying means, said terminal means including means for connection with a conversation recorder to transmit both the tone warning and amplified voice to the recorder, said tone warning and voice amplifying circuits and said terminal elements being connected in electrical communication so that when one of the circuits is closed all must be closed and when one circuit is open the others are automatically opened whereby it will be impossible to transmit the voices to the recorder without transmitting the tone warning therewith, and a D. C. current blocking condenser in one telephone line connection to the transformer and a resistor connected in the telephone line connection containing the condenser, the ratio of said condenser, resistor and transformer being selected to provide a tone signal difference of a voltage ratio of approximately ten to one between the local telephone station and the distant telephone station.

6. A recorder-connector as claimed in claim 1 including means for controlling the sounding of said tone warning comprising a keying switch, and an electric clock type motor for operating said keying switch at predetermined intervals.

7. A recorder-connector as claimed in claim 1 including a D. C. current blocking condenser in one telephone line connection to the transformer and a resistor connected in the telephone line connection containing the condenser, the ratio of said condenser, resistor and transformer being selected to provide a tone signal difference of a voltage ratio of approximately ten to one between the local telephone and the distant telephone station, and means for controlling the sounding of said tone warning comprising a keying switch, and an electric clock type motor for operating said keying switch at predetermined intervals.

8. A recorder-connector as claimed in claim 1 wherein said tone warning sounding means includes an oscillator tube, a current cycle regulating bridge connected in the circuit between the transformer and the oscillator, and an adjustable resistor in said bridge to permit adjustment of the resistance of the bridge to compensate for inaccuracies in the bridge-forming elements.

9. A recorder-connector as claimed in claim 1 wherein said tone warning sounding means includes an oscillator tube, a current cycle regulating bridge connected in the circuit between said oscillator tube and said transformer, means connecting said oscillator to said terminal element to conduct the tone warning sounded by the oscillator to a recorder connected to said terminal element, said last named connecting means including a buffer amplifier and a low pass filter.

10. A recorder-connector as claimed in claim 1 wherein said tone warning sounding means includes an oscillator tube, a current cycle regulating bridge connected in the circuit between said oscillator tube and said transformer, means connecting said oscillator to said terminal element to conduct the tone warning sounded by the oscillator to a recorder connected to said terminal element, said last named connecting means including a buffer amplifier and a low pass filter, and an adjustable resistor in said current cycle-regulating bridge to permit adjustment of the resistance of the bridge to compensate for inaccuracies in the bridge forming elements.

11. A recorder connector as claimed in claim 1 wherein said tone warning sounding means includes an oscillator tube, a current cycle-regulating bridge connected in the circuit between said oscillator tube and said transformer, means connecting said oscillator to said terminal element to conduct the tone warning sounded by the oscillator to a recorder connected to said terminal element, said last named connecting means including a buffer amplifier and low pass filter, a keying switch for controlling the oscillation of said oscillator, and an electric clock type motor for operating said keying switch at predetermined intervals.

12. A recorder-connector as claimed in claim 2 wherein said tone warning sounding means includes an oscillator tube, a current cycle regulating bridge connected in the circuit between the said oscillator tube and said transformer, means connecting said oscillator to said terminal element to conduct the tone warning sounded by the oscillator to a recorder connected to said terminal element, said last named connecting means including a buffer amplifier and a low pass filter, and an adjustable resistor in said current cycle-regulating bridge to permit adjustment of the resistance of the bridge to compensate for inaccuracies in the bridge forming elements.

13. A recorder-connector as claimed in claim 1 wherein said voice amplifying means includes a triode amplifying tube connected in circuit with said transformer and said terminal element, and a band elimination filter connected in the circuit between the triode and the transformer.

14. A recorder-connector as claimed in claim 1 wherein said voice amplifying means includes a triode amplifying tube connected in circuit with said transformer and said terminal element, a band elimination filter connected in the circuit between the triode and the transformer, and an impedance matching transformer connected in circuit between said triode and said terminal elements.

15. A recorder-connector as claimed in claim 1 wherein said tone warning sounding means includes an oscillator tube, a courrent cycle-regulating bridge connected in the circuit between said oscillator tube and said transformer, means connecting said oscillator to said terminal elements to conduct the tone warning sounded by the oscillator to a recorder connected to said terminal element, said last named connecting means including a buffer amplifier and a low pass filter, said voice amplifying means including a triode amplifying tube connected in circuit with said terminal element and naid transformer, and a current rectifier connected in the circuits between said terminal element and said oscillator and triode tubes.

16. A recorder-connector as claimed in claim 1 wherein said tone warning sounding means includes an oscillator tube, a current cycle-regulating bridge connected in the circuit between said oscillator tube and said transformer, means connecting said oscillator to said terminal elements to conduct the tone warning sounded by the oscillator to a recorder connected to said terminal element, said last named connecting means including a buffer amplifier and a low pass filter, said voice amplifying means including a triode amplifying tube connected in circuit with said terminal element and said transformer, a current rectifier connected in the circuits between said terminal element and said oscillator and triode tubes, a band elimination filter connected in the circuit between said triode and the transformer, and an impedance matching transformer connected in circuit between said triode and terminal element.

17. A recorder-connector as claimed in claim 1 wherein said tone warning sounding means includes an oscillator tube, a current cycle-regulating bridge connected in the circuit between said oscillator tube and said transformer, means connecting said oscillator to said terminal elements to conduct the tone warning sounded by the oscillator to a recorder connected to said terminal element, said last named connecting means including a buffer amplifier and low pass filter, said voice amplifying means including a triode amplifying tube connected in circuit with said terminal element and said transformer, a current rectifier connected in the circuits between said terminal element and said oscillator and triode tubes, a band elimination filter connected in the circuit between said triode and the transformer, an impedance matching transformer connected in circuit between said triode and terminal element, a keying switch for controlling oscillation of said oscillator, and an electric clock type motor for operating said keying switch at predetermined intervals.

18. A recorder-connector as claimed in claim 1 wherein said tone warning sounding means includes an oscillator tube, a current cycle-regulating bridge connected in the circuit between said oscillator tube and said transformer, means connecting said oscillator to said terminal element to conduct the tone warning sounded by the oscillator to a recorder connected to said terminal element, said last named connecting means including a buffer amplifier and low pass filter, said voice amplifying means including a triode amplifying tube connected in circuit with said terminal element and said transformer, a current rectifier connected in the circuits between said terminal element and said oscillator and triode tubes, a band elimination filter connected in the circuit between said triode and the transformer, an impedance matching transformer connected in circuit between said triode and said terminal element, a keying switch for controlling the oscillation of said oscillator, an electric clock type motor for operating said keying switch at predetermined intervals, a D. C. current blocking condenser in one telephone line connection to the transformer and a resistor connected in the telephone line connection containing the condenser, the ratio of said condenser resistor and transformer being selected to provide a tone warning signal difference of a voltage ratio of approximately ten to one between the local telephone station and the distant telephone station.

19. In a recorder connector for connecting a conversation recorder in a telephone line, line connecting means for connecting said recorder connector in a telephone line including an audio transformer, terminals to provide connection between the transformer and the wires of a telephone line, means connected in circuit with said transformer to sound a tone warning at predetermined time intervals for a predetermined time duration, a terminal element, means connecting said terminal element with said tone warning sounding circuit means, voice current conducting means including means for connecting the voice current conducting means in circuit with said transformer, means for connecting said voice circuit conducting means with said terminal element, said terminal element including means for connection with a conversation recorder to transmit both the tone warning and voice to the recorder.

20. A recorder connector as claimed in claim 19 wherein said tone warning sounding means and voice current conducting means and said terminal element are connected in electrical communication so that when one of the circuits is closed all must be closed and when one circuit is open the others are automatically opened whereby it will be impossible to transmit the voices to a recorder without transmitting the tone warning therewith.

21. A recorder connector as claimed in claim 20 including means for controlling the sounding of said tone warning comprising a keying switch, and an electric clock type motor for operating said keying switch at predetermined intervals.

22. A recorder connector as claimed in claim 19 wherein said tone warning sounding means includes an oscillator tube, a current cycle regulating bridge connected in the circuit between said oscillator tube and said transformer, means connecting said oscillator tube to said terminal element to conduct the tone warning sounded by the oscillator to a recorder connected to said terminal element.

JOHN P. SMITH, Jr.

REFERENCES CITED

The following references are of record in the file of this patent:

UNITED STATES PATENTS

| Number | Name | Date |
|---|---|---|
| 1,551,319 | Neyberg | Aug. 25, 1925 |
| 1,780,919 | Holland | Nov. 11, 1930 |
| 1,845,034 | Bickelhaupt | Feb. 16, 1932 |
| 2,431,797 | Ffolliott | Dec. 2, 1947 |